March 10, 1953     W. C. BIRTWELL     2,630,839
LAY MOTION FOR LOOMS
Filed July 5, 1949     15 Sheets-Sheet 1
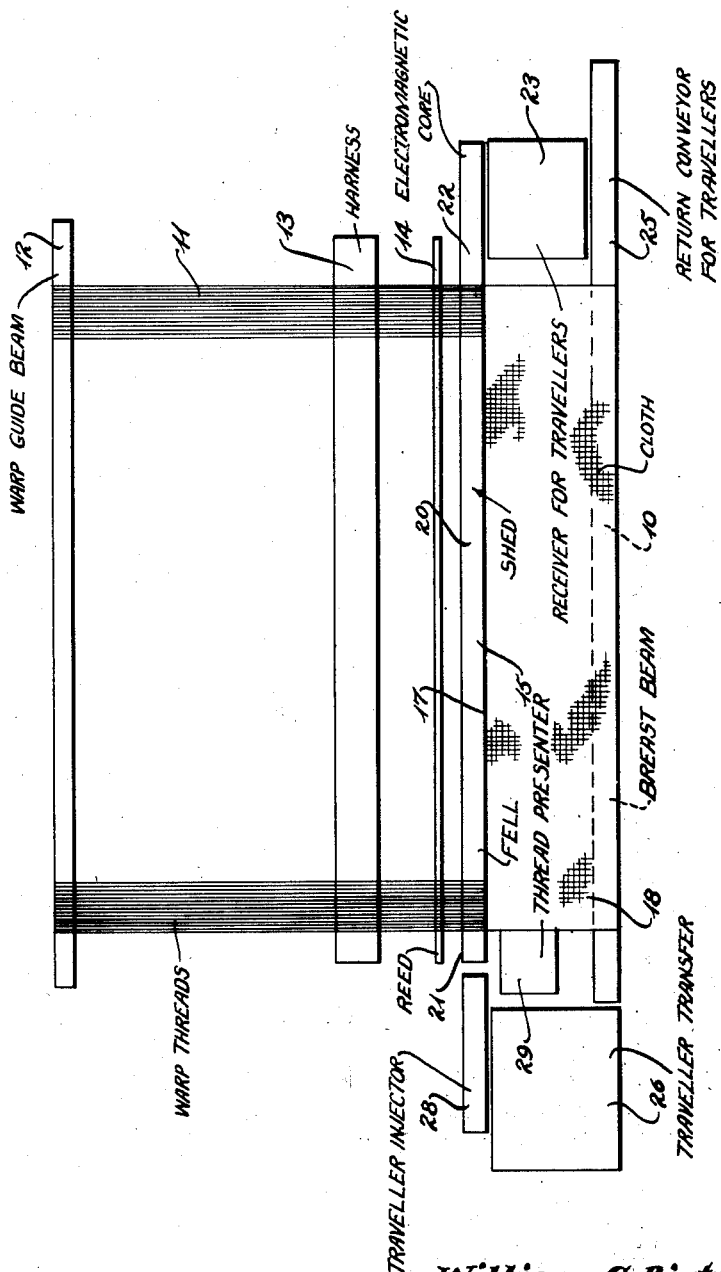
Inventor
William C. Birtwell
By Cushman, Darby & Cushman
ATTORNEYS

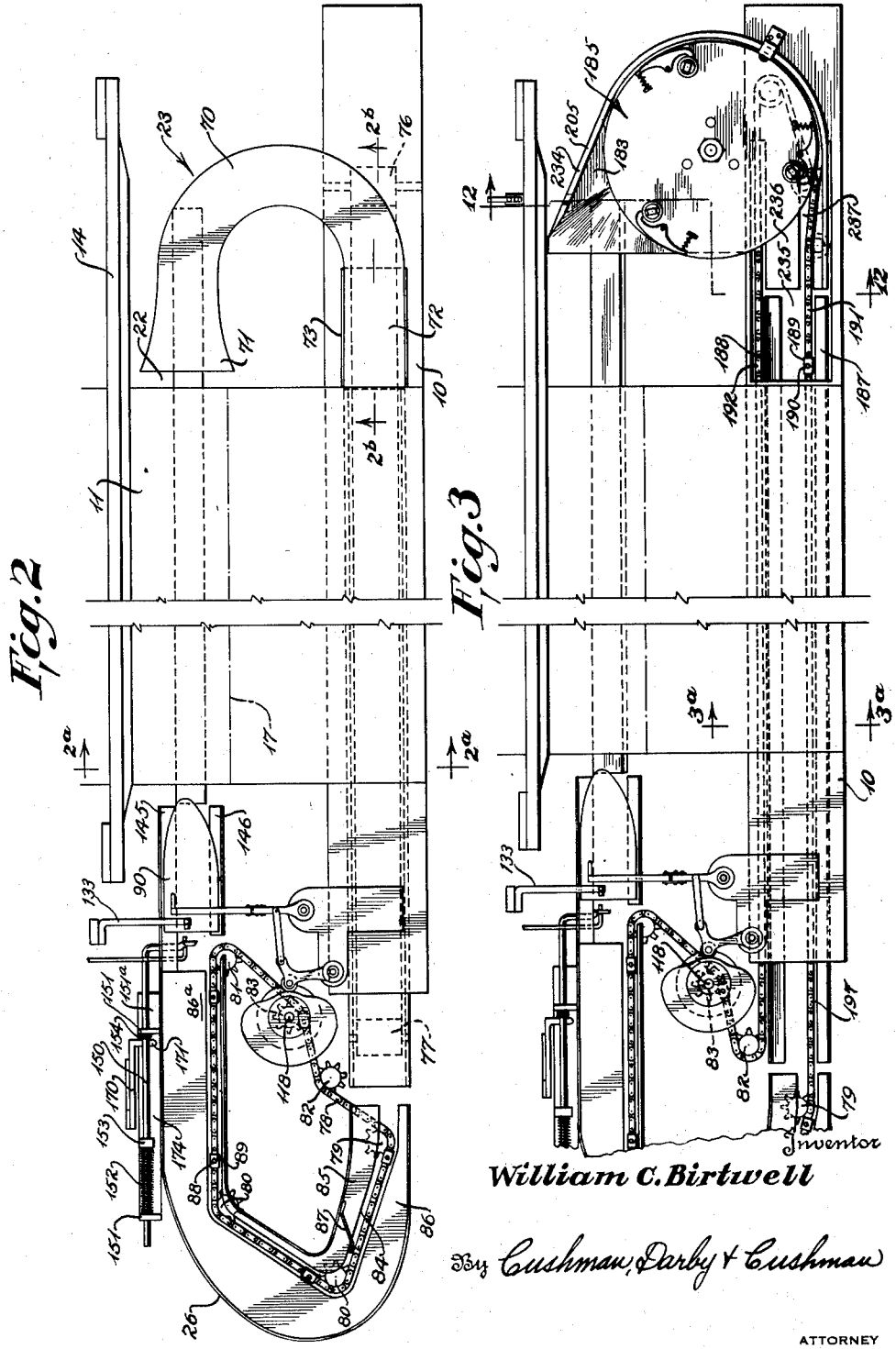

March 10, 1953 W. C. BIRTWELL 2,630,839
LAY MOTION FOR LOOMS
Filed July 5, 1949 15 Sheets-Sheet 3
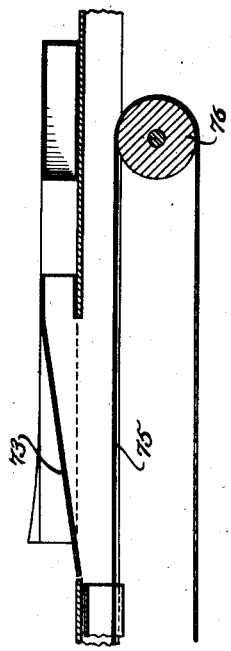
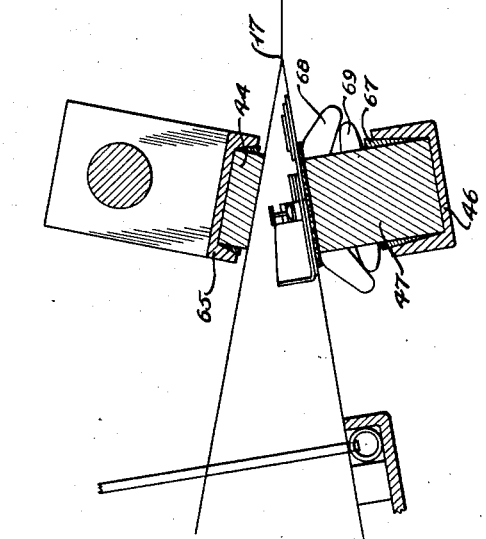
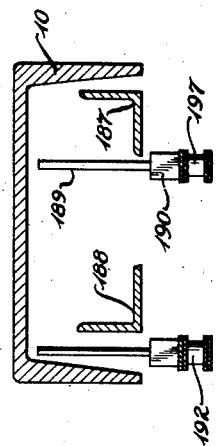
Inventor
*William C. Birtwell*
By *Cushman, Darby & Cushman*
ATTORNEYS

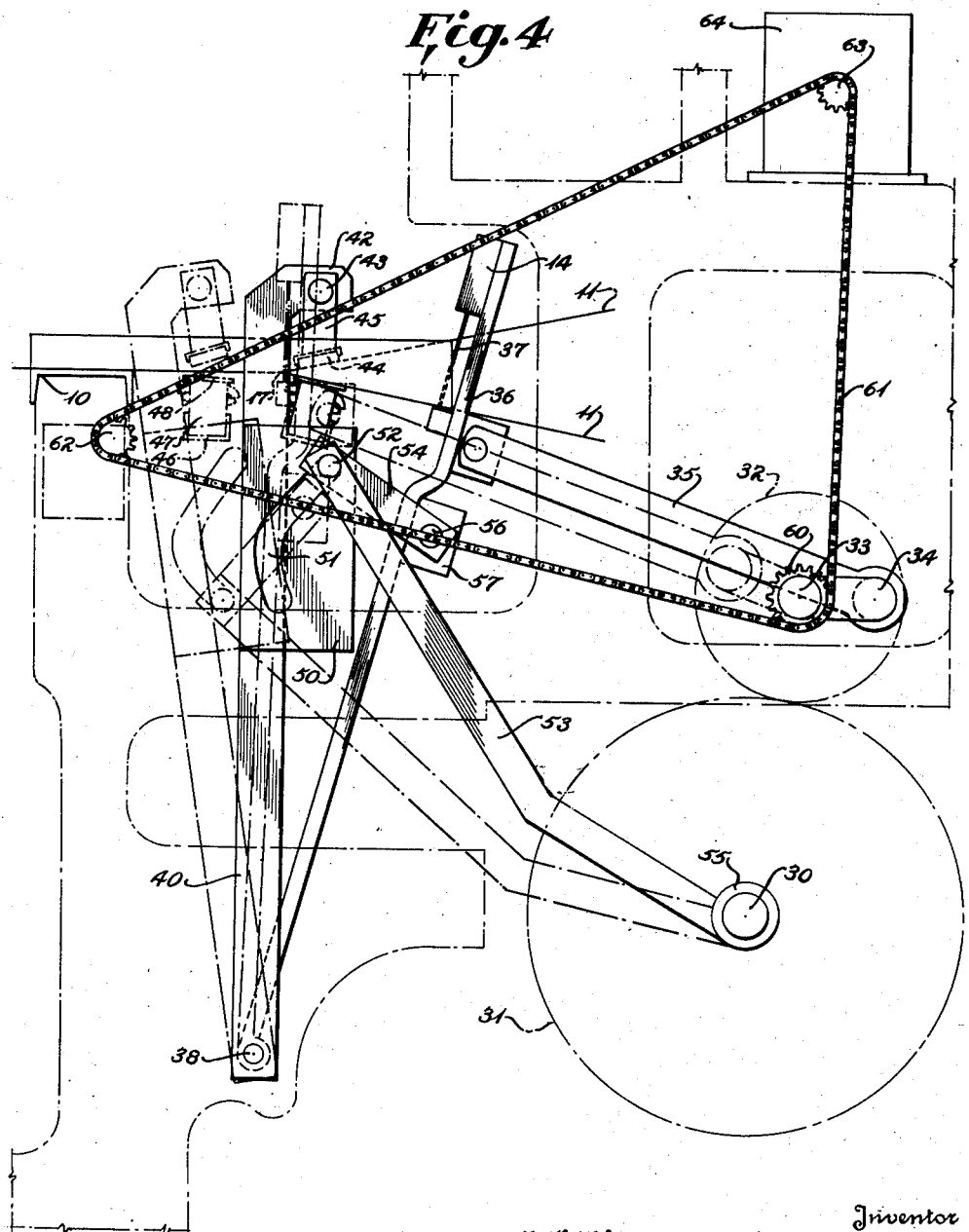

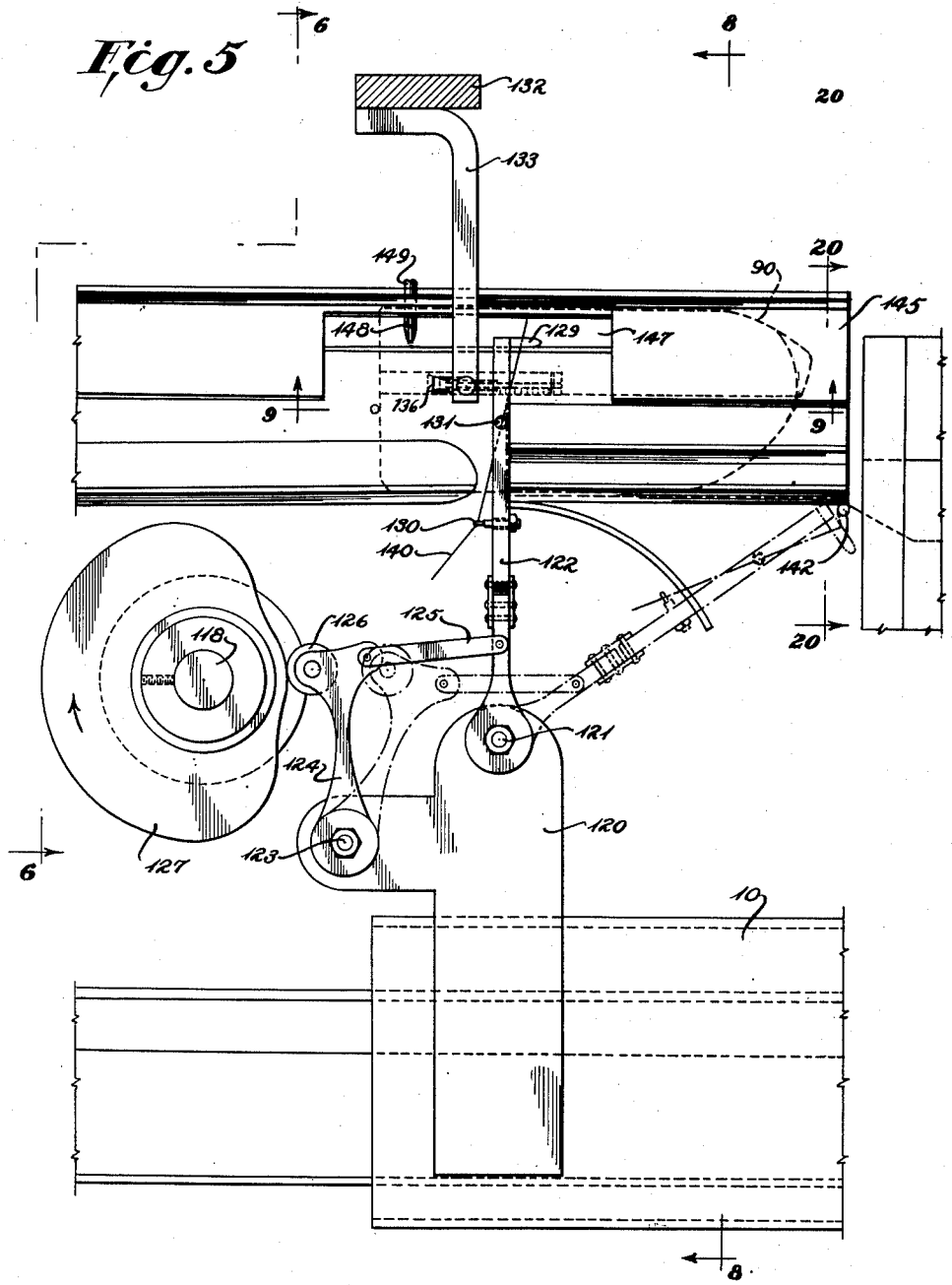

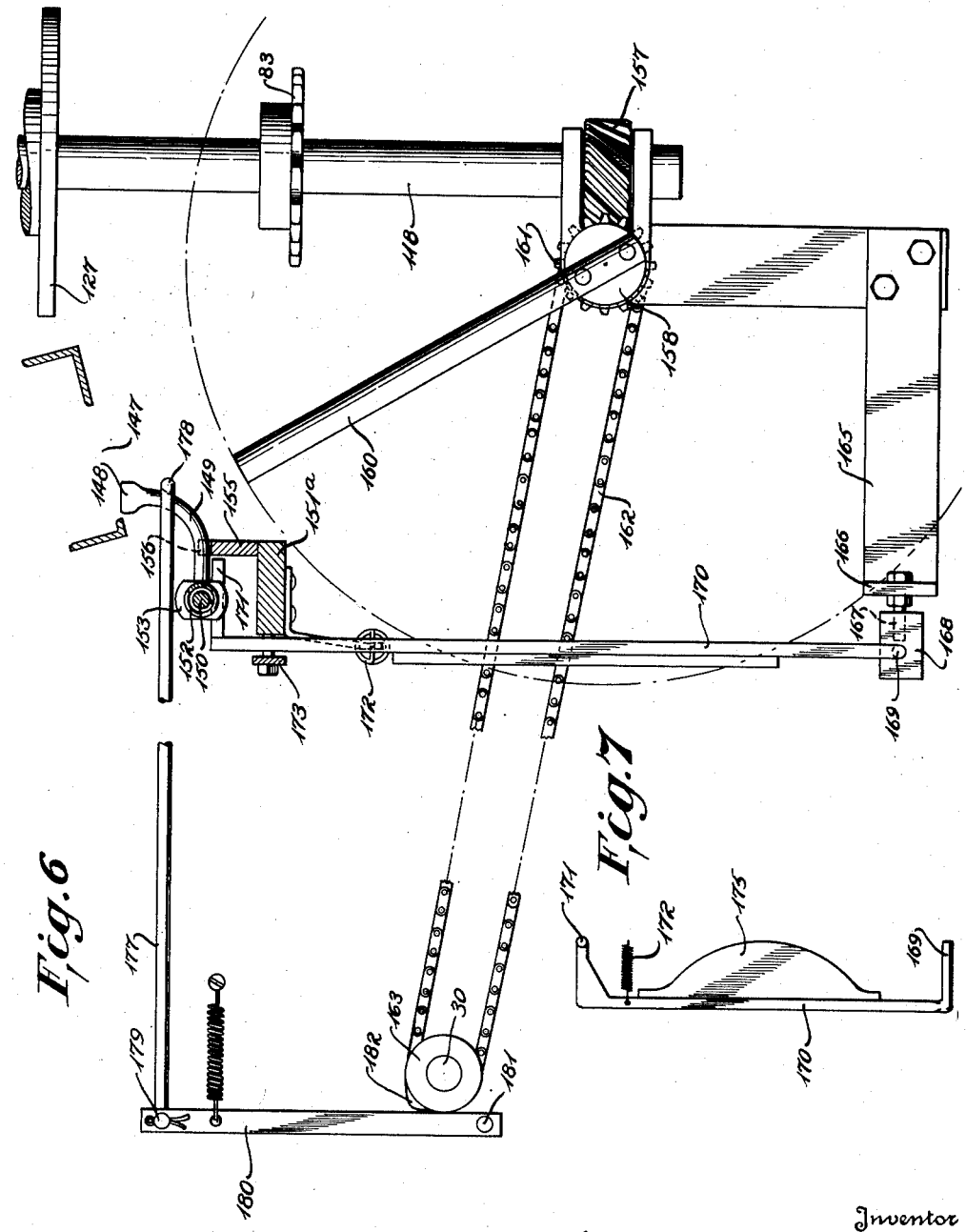

March 10. 1953
W. C. BIRTWELL
2,630,839
LAY MOTION FOR LOOMS
Filed July 5, 1949
15 Sheets-Sheet 7
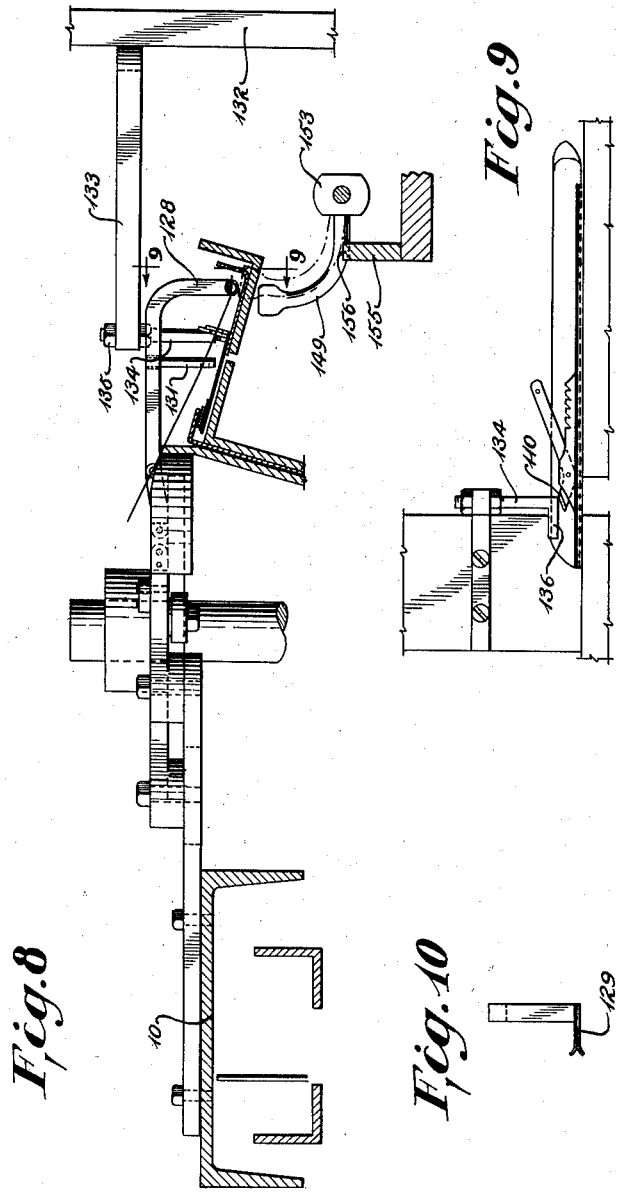
INVENTOR.
William C. Birtwell
BY
Cushman, Darby & Cushman
Attorneys

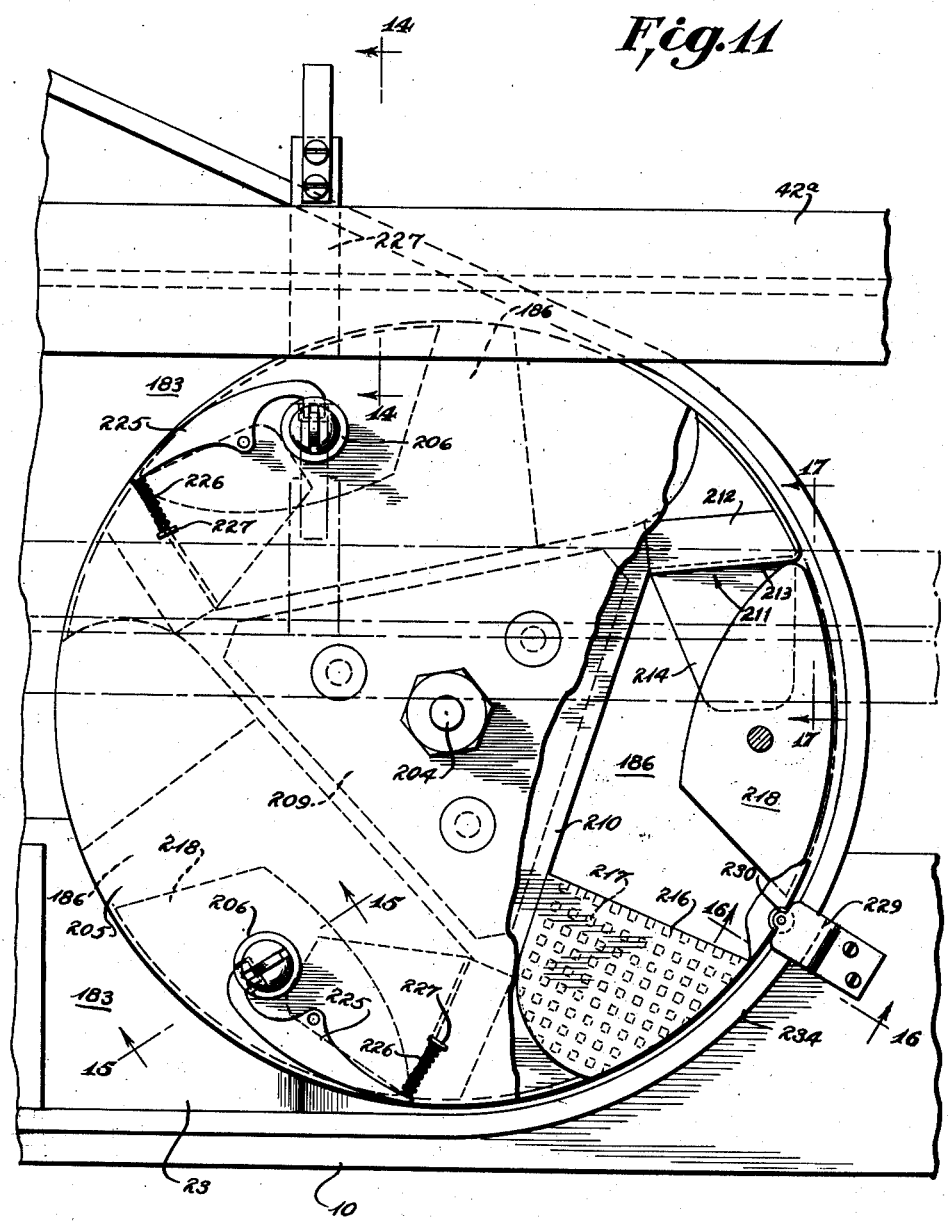

March 10, 1953 W. C. BIRTWELL 2,630,839
LAY MOTION FOR LOOMS
Filed July 5, 1949 15 Sheets-Sheet 9
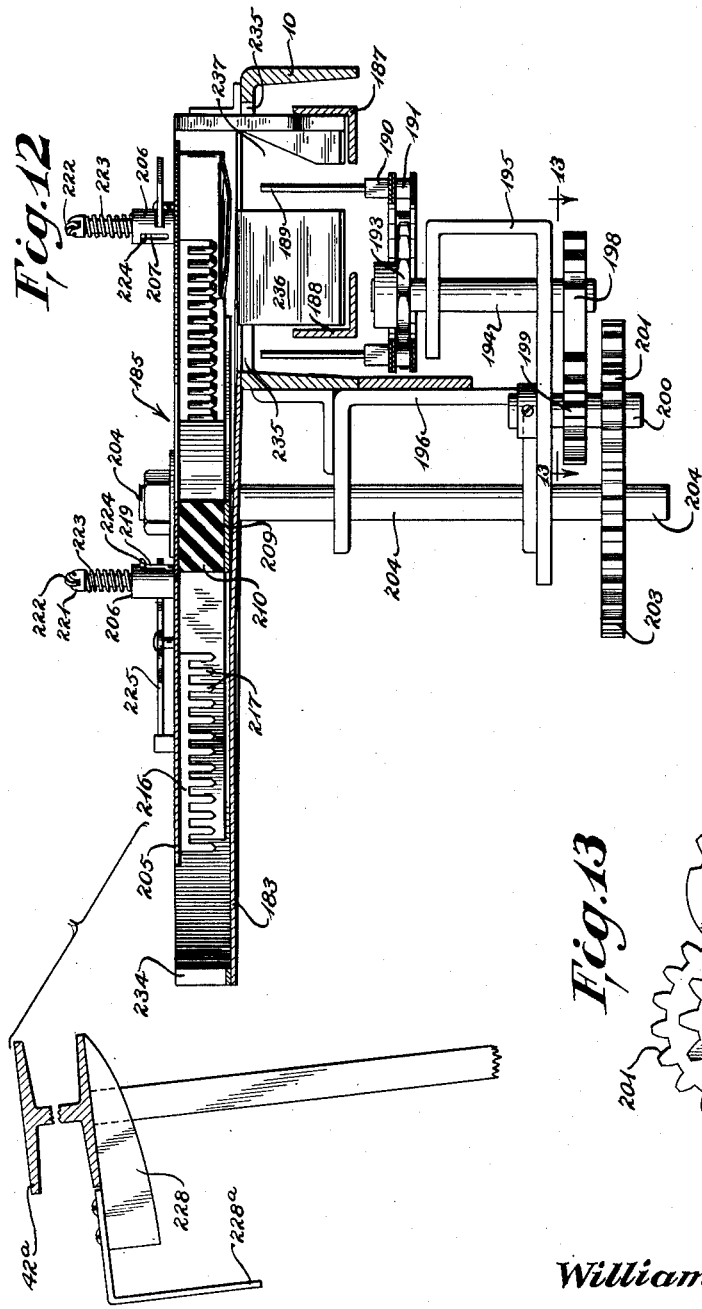
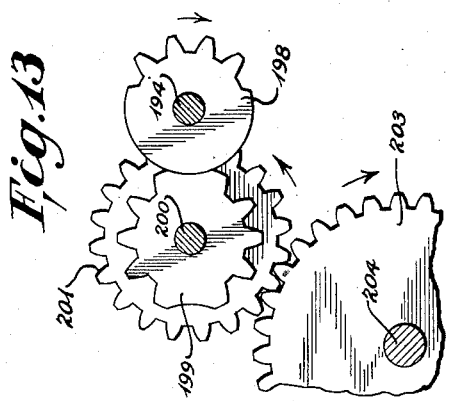
Inventor
William C. Birtwell
By Cushman, Darby & Cushman
Attorneys

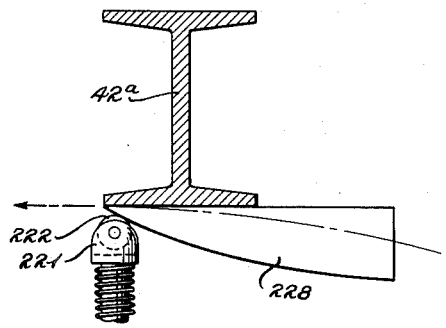
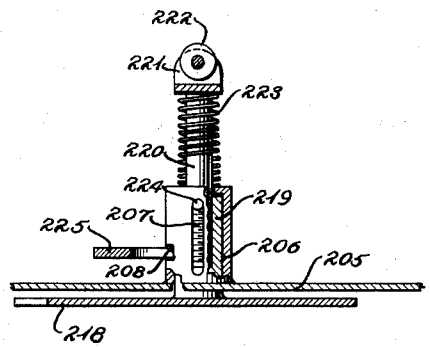
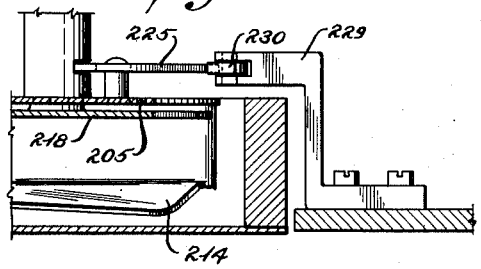
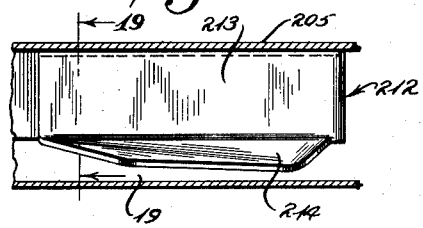
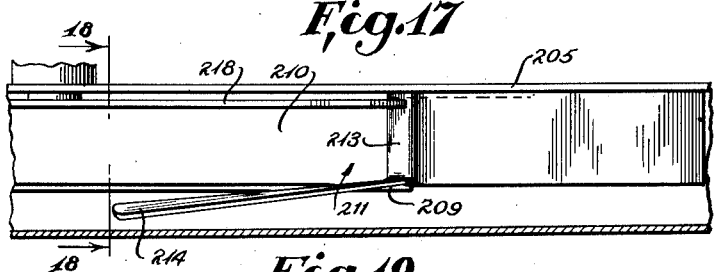
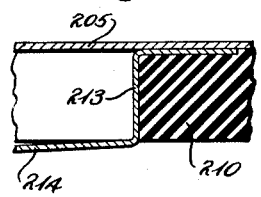

March 10, 1953  W. C. BIRTWELL  2,630,839
LAY MOTION FOR LOOMS
Filed July 5, 1949  15 Sheets-Sheet 11
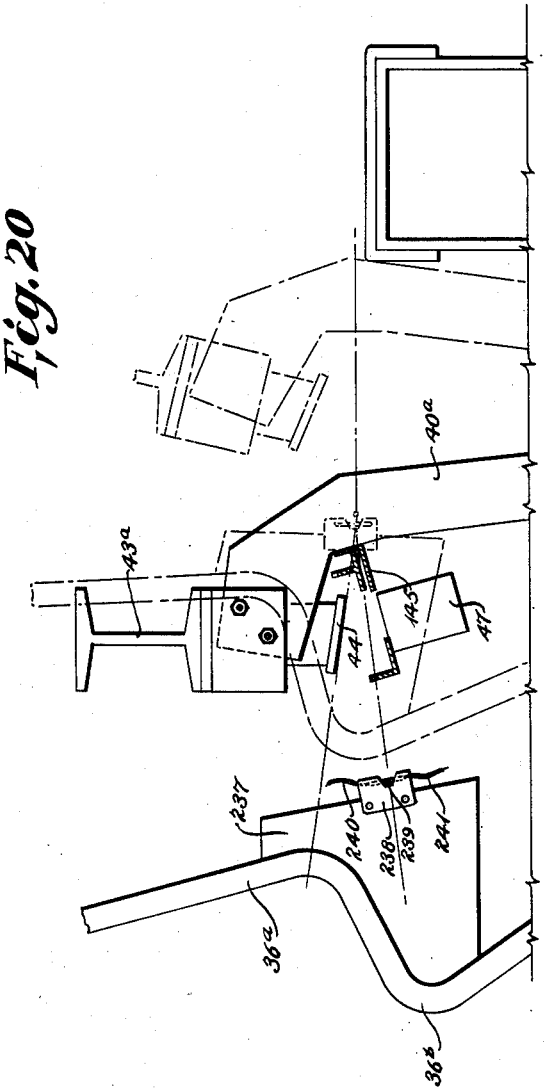
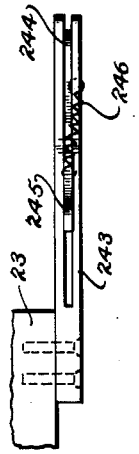
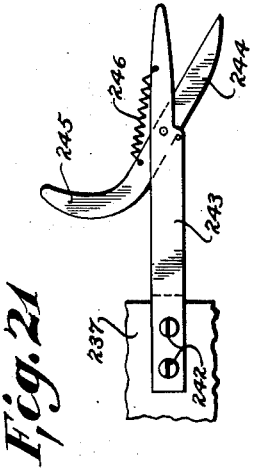
INVENTOR.
William C. Birtwell
By Cushman, Darby & Cushman
Attorneys March 10, 1953     W. C. BIRTWELL     2,630,839
LAY MOTION FOR LOOMS
Filed July 5, 1949                                       15 Sheets—Sheet 12
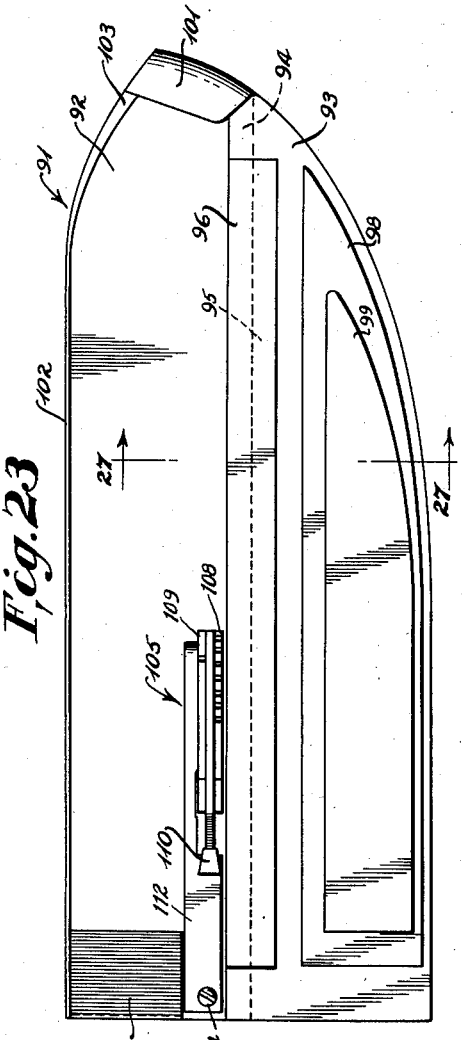
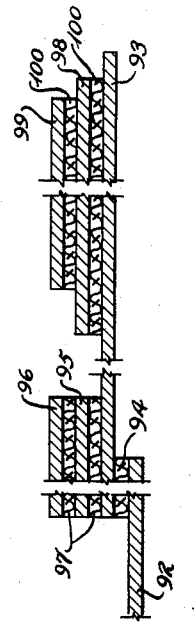
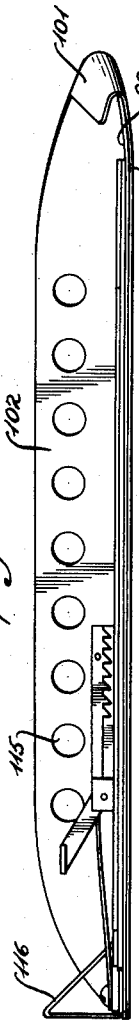
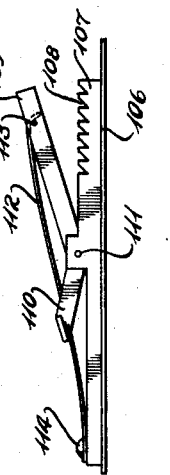
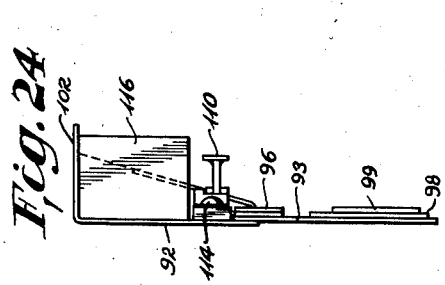
Inventor
*William C. Birtwell*
By *Cushman, Darby & Cushman*
Attorneys.

March 10, 1953  W. C. BIRTWELL  2,630,839
LAY MOTION FOR LOOMS
Filed July 5, 1949  15 Sheets-Sheet 13

INVENTOR.
William C. Birtwell
BY
Cushman, Darby & Cushman
Attorneys

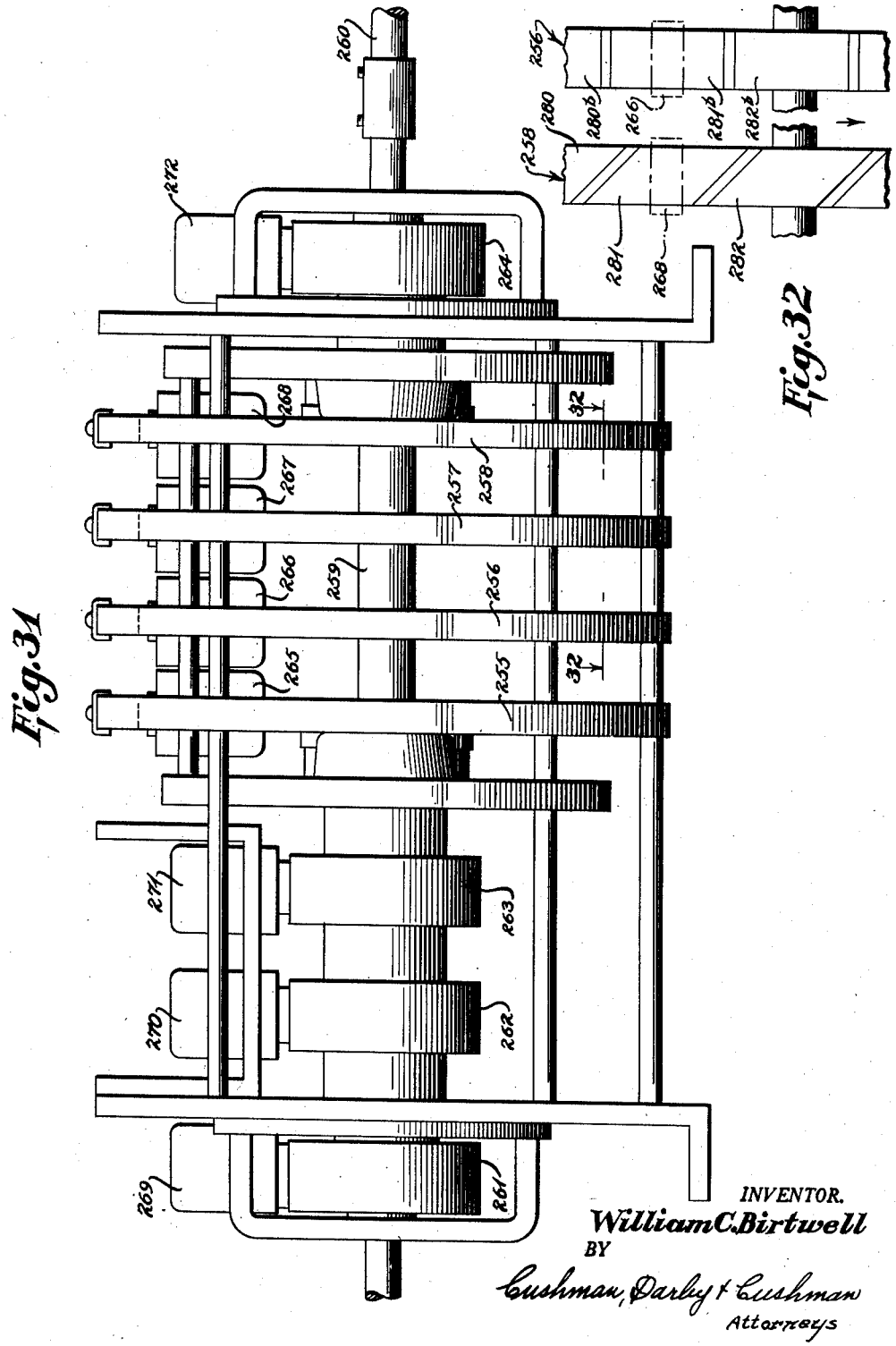

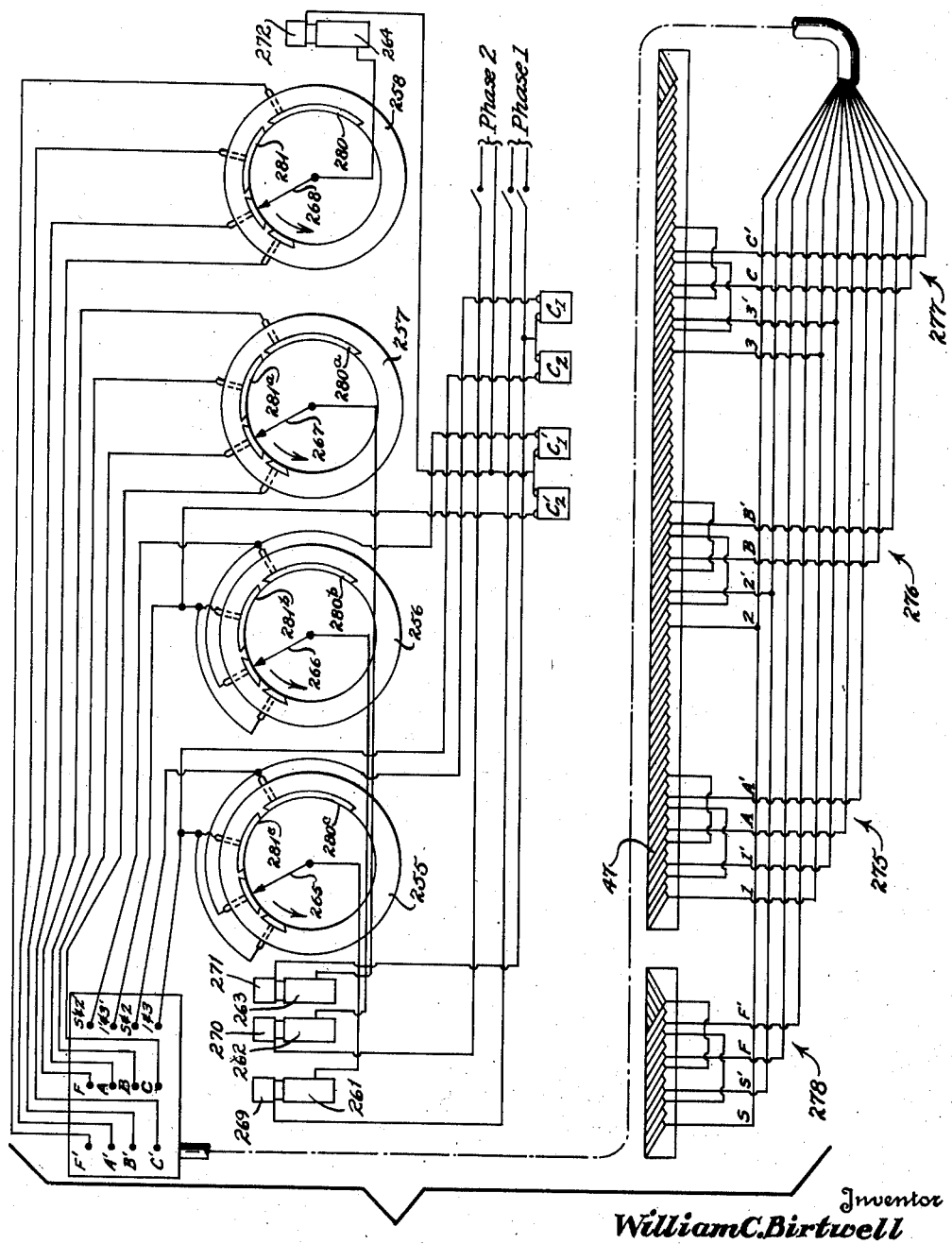

Patented Mar. 10, 1953

2,630,839

UNITED STATES PATENT OFFICE 2,630,839

LAY MOTION FOR LOOMS

William C. Birtwell, North Scituate, R. I., assignor to Dunn Worsted Mills, Woonsocket, R. I., a corporation of Rhode Island Application July 5, 1949, Serial No. 103,125

25 Claims. (Cl. 139—126)

The present invention relates to a shuttleless loom and, more particularly, to a new and improved electrical system for actuating the devices for carrying the weft threads through the shed.

A primary object of the invention is to provide, in a loom, new and improved electrical devices, circuits, and circuit controllers for actuating a plurality of thread carrying travellers, to the end that the weft threads are carried through the shed in position to be beaten into the fell of the cloth. Instrumentalities of various types may be used in combination with the electrical devices, to control the return movements of the travellers, to effect the presentation of the weft threads to the travellers, to secure the same therein, to inject the travellers into position to be acted upon by the electrical devices and to cut the thread and release the same from the travellers at the conclusion of their movement through the shed.

The invention of the present application is concerned primarily with the electrical devices and the electrical system, as many different types of mechanical devices may be employed in combination therewith.

An object of the invention is to provide a loom in which the use of thread holding, storing, and carrying shuttles are eliminated, and in which the weft threads are always drawn from a source of supply, in the same direction through the shed.

Another object of the invention is to provide a loom in which the weft threads are carried through the shed by one or more travellers having means associated therewith for grasping and then releasing the thread.

Another object is to provide means for creating a linearly travelling electromagnetic field along the lay of a loom from one end thereof toward the other end, and to provide, in combination therewith, a thread carrying traveller in which currents are induced by the flux of said field to cause the traveller to traverse the lay.

Another object is to provide a thread carrying traveller of non-magnetic material in which the currents are induced and in which the induced currents, reacting upon the flux in the field cause the traveller to traverse the lay.

Another object of the invention is to provide an elongated magnetic core having a plurality of induction coils wound thereon, providing a linear polyphase winding and producing a linearly travelling electromagnetic field along the core and along the lay in a direction from one end thereof to the other, in combination with circuit controlling devices for energizing the core throughout only a relatively short section thereof at one time, and for shifting the energized sections progressively from end to end of the core.

Another object of the invention is to reduce very materially the currents required to energize the coils associated with the core, first, by delivering the current thereto, section by section and, second, by using capacitances in the energizing circuits.

Another object of the invention is to facilitate switching of the current from section to section or group to group of coils and to eliminate sparking, by including in the circuit, capacitances through which the coils may discharge, before being disconnected from the current source.

Another object of the invention is to reduce the number of capacitances which would otherwise be required by using a single capacitance for alternate groups of coils in each phase.

Another object of the invention is to provide means for handling a relatively large number of individual travellers, successively, to the end that there will be a substantial time delay between the emergence of any one traveller from the electromagnetic field and the re-introduction thereof, with a new thread, into the field, to the end that the travellers will not become overheated as a result of the induction of currents therein, as would be the case if only one or a few travellers or shuttles were repeatedly subjected to the influence of the field in closely spaced time sequence.

Another object is to provide an improved traveller construction having self-guiding means associated therewith, tending to center the same in predetermined relation, relative to the electromagnetic field, to the end that the traveller, during its traverse of the lay will not be projected laterally from the field by the electromagnetic forces but will follow the line of the core from end to end.

A further object of the invention is to so control the duty cycle for each individual section of the electromagnetic core that the geometry of said core be reduced to a practical minimum. In other words, the invention aims to reduce the size of the coils and core and the gauge of the wire in the windings, while preventing overheating of the coils and core, by energizing any one section of the core for only a fraction of the time that the machine is in operation. For instance, if there are three sections in the core, each section is energized only one-third of the time, with the result that the geometry of the coils and core need be only one-third of that which would be required if the section were energized continuously.

Another object of the invention is to employ capacitors in the circuit to correct power factor in the electromagnetic induction system.

Although the invention is not confined to the use of high frequency polyphase alternating current, an object of the invention is to provide a system in which current of this type may be employed, in order that vastly smaller and less expensive capacitors may be used.

The loom of the present invention necessarily includes certain standard elements which may be of conventional form or of special design, so long as they perform their intended functions. For instance, warp threads are led through harnesses to the fell of the cloth, adjacent the lay, and a reed is provided to beat the weft into the fell, as the harnesses are operated and as the warp threads are separated to provide a shed through which the next weft thread is carried. The essential features of the present loom, in addition to the foregoing are a plurality of travellers, an injection and feed system for the travellers, the electromagnetic means for causing the travellers to traverse the lay, means for receiving the travellers at the discharge end of the lay, means for releasing the threads from the travellers at the conclusion of this movement, means for returning the travellers to the injection and feed system, means for presenting a thread to each traveller prior to its passage through the lay and means for cutting the thread after the passage of each traveller through the lay.

As stated above, these means may take many different forms, and the ones shown herein are for purposes of illustration only, as the present invention relates to the general combination of such means and to the electrical devices, circuits and systems for causing and controlling the movement of the travellers through the shed and along the lay.

Fundamentally, in the operation of the apparatus in accordance with the invention, each traveller is conveyed through the feed system to the injection device, be it electrical or mechanical, into a position where a thread presenting device or color selector presents a thread to the traveller. The injector then moves the traveller into the shed of the loom and into the linearly travelling electromagnetic field produced by the linear polyphase winding on the electromagnetic core, with the result that the currents induced in the traveller cause the same to move rapidly in the direction of movement of the field. The coils along the core are energized successively, section by section, as the traveller moves therealong so that, in effect, the traveller is continuously subjected to a linearly travelling polyphase field from end to end of the shed or the like. The traveller emerges from the shed and enters a receiving device, which may be of one type or another, where the thread which has been carried through the shed by the traveller is released. The traveller is then returned to the reserve supply of travellers and the thread at the infeed end of the shed is cut, while the reed beats the thread into the fell of the cloth and the harnesses shift the warp threads in the usual manner. When this action has been completed, another traveller is delivered to the injector and a thread is presented thereto, as previously described, and the cycle is repeated.

In the accompanying drawings, a number of specific embodiments of the invention are shown, but it must be understood that the invention is not limited thereto and, more particularly, is not to be restricted to the particular mechanical devices for handling the travellers after their movement through the shed, for delivering the travellers to the head end of the lay, for injecting the travellers into the field and for cutting the thread and releasing the same from the travellers, as many alernative mechanical devices for performing similar functions will readily occur to one skilled in the art.

In the drawings:

Figure 1 is a block diagram, in plan, showing the relative position and arrangement of the fundamental elements of the invention;

Figure 2 is a plan view, with certain parts removed, taken on a plane just above the cloth and showing one means for returning the travellers and for presenting them to the injection device;

Figure 2a is a transverse section on line 2a—2a of Figure 2;

Figure 2b is a section on line 2b—2b of Figure 2;

Figure 3 is a view similar to Figure 2, showing a modification;

Figure 3a is a section on line 3a—3a of Figure 3;

Figure 4 is a section and elevation, with certain parts omitted, taken at the foot or discharge end of the lay.

Figure 5 is a plan view, with certain parts omitted, showing one form of thread presenting device and certain parts of the traveller injecting mechanism;

Figure 6 is a somewhat diagrammatic view, in section and elevation, showing certain of the parts of Figure 5, taken substantially on line 6—6 of Figure 5;

Figure 7 is an elevation of the injector return arm, looking from the left of Figure 6;

Figure 8 is a fragmentary transverse section and elevation, taken substantially on line 8—8 of Figure 5;

Figure 9 is a similar view, taken substantially on line 9—9 of Figure 5;

Figure 10 is a detail elevation of the thread gripping fingers associated with the thread presenting device;

Figure 11 is a plan view with certain parts broken away, showing one form of mechanism for receiving the travellers after their passage through the shed;

Figure 12 is a vertical section of the mechanism of Figure 11, taken substantially along line 12—12 of Figure 3;

Figure 13 is a detail horizontal section on line 13—13 of Figure 12;

Figure 14 is a fragmentary section and elevation on line 14—14 of Figure 11;

Figure 15 is a similar section and elevation taken on line 15—15 of Figure 11;

Figure 16 is a similar section taken substantially on line 16—16 of Figure 11;

Figure 17 is a section and elevation taken on line 17—17 of Figure 11;

Figure 18 is a fragmentary section taken on line 18—18 of Figure 17;

Figure 19 is a fragmentary section on line 19—19 of Figure 18;

Figure 20 is an end elevation and partial section at the head end of the lay, taken substantially on line 20—20 of Figure 5 and showing one type of thread cutting device;

Figure 21 is a fragmentary elevation showing a thread cutting shear mechanism, as a modification;

Figure 22 is a fragmentary plan view of the mechanism shown in Figure 21;

Figure 23 is a plan view of a preferred form of thread carrying traveller;

Figure 24 is an end view, taken from the left of Figure 23;

Figure 25 is a side elevation of the traveller shown in Figure 23;

Figure 26 is an enlarged elevation of the thread clamping mechanism in the open position;

Figure 27 is a transverse view, on a greatly enlarged scale on line 27—27 of Figure 23;

Figure 31 is a side elevation of a program switch;

Figure 32 is a diagrammatic view showing the arrangement of contacts on certain of the stationary contact rings of the program switch; and Figure 33 is a circuit diagram.

Figure 28:
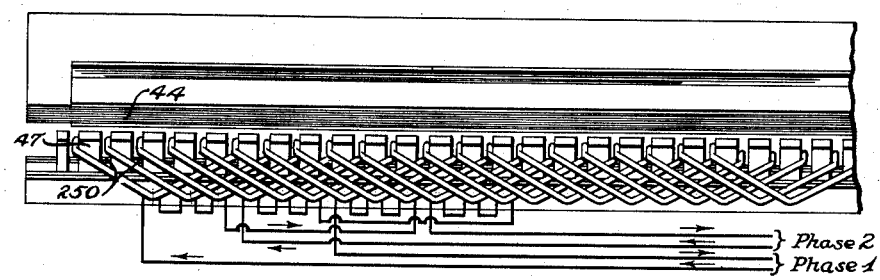
Figure 28 is a side elevation, with an end section broken away, showing the top and bottom cores, the coils wound on the latter, and, diagrammatically, the electrical connections for certain of the coils.

Referring to Figure 1, the breast beam of a loom is shown at 10. The warp threads 11 are drawn from a source of supply, such as a warp beam, over a guide beam 12, forwardly through the harness 13 and the reed 14, to the shed 15. The fell of the cloth is indicated at 17 and the cloth 18 is drawn downwardly from the breast beam 10 and wound up in conventional manner.

The elongated electromagnetic core 20 extends along the lay, from the head end 21 to the foot end 22. The thread carrying travellers are projected along the lay by the travelling electromagnetic field, as hereinafter explained. At the foot end, the travellers are received in a mechanism 23, which releases the thread from each traveller and starts the traveller on its return path. As pointed out below, this mechanism may be in the form of a curved chute or an intermittently actuated dial, having pockets for receiving the travellers. The travellers are delivered to a return conveyor 25, preferably positioned below the breast beam, by which they are returned to the head end of the loom. At the latter end, they are handled by a mechanism 26, which delivers them to an injector 28. At this point, a thread is presented to each traveller by the color selector or thread presenting mechanism 29. The injector mechanism projects the traveller into the shed of the cloth, above the core, and the travelling electromagnetic field carries the traveller along the lay, drawing the thread behind, through the shed. The reed 14 beats the thread into the fell while the harnesses 13 operate in the usual manner. The trailing end of the thread, adjacent the color selector or thread presenter 29 is severed and the leading end is released from the traveller. The cycle of operations is immediately repeated, with another traveller entering the injector mechanism 28.

Referring to Figure 4, one embodiment of the invention has been illustrated as an attachment to and a modification of a well-known type of Crompton & Knowles loom. The main drive shaft for the loom, indicated at 30 carries a large spur gear 31, in mesh with a smaller gear 32 on a shaft 33 having cranks on its opposite ends, one of which is shown at 34. The cranks are connected by pitmans 35 to the lay swords 36 carrying the reed mechanism 14. The reed includes a plurality of fine wires or reeds 37, between which the warp threads 11 extend, as is well understood in the art, so that the reed beats the weft threads into the fell 17 of the cloth. Projecting upwardly from the pivots 38 for the lay swords are a pair of elongated arms, one of which is shown at 40 in Figure 4. The upper ends of the arms project rearwardly as at 42 and are interconnected by a bar 43, from which an upper core member 44 is suspended by hangers 45. An upwardly facing channel member 46, also carried by the arms, serves as a support for the lower core member 47, the upper surfaces of which carry a Micarta strip 48, or a strip of similar synthetic resin, laminated insulating material.

The core supporting arms have secured to their side faces rearwardly projecting plates 50, each provided with a cam slot 51, in which a roller, secured to a stub shaft 52 is disposed. The stub shaft is disposed within aligned openings in the ends of links 53 and 54, respectively. The former is a bent link, having its other end connected to a sleeve 55, loose on the main driving shaft 30, and the latter has its other end pivoted to a pin 56 carried by a block 57 mounted upon the lay sword 36.

As a result of this arrangement, the crank 34 swings the lay sword back and forth, with a simple harmonic movement, in timed relation to the other movements of the loom, as is well understood in the art. The connection between the lay sword and the core supporting arms, just described, is such that the reed quite closely approaches the cores, before they move forwardly toward the breast beam 10. During the final portion of the travel of the reed, however, the core supporting arms move forwardly with accelerated movement so that, when the reed beats the thread into the fell of the cloth, the cores are moved out of the way, to the dotted line position in Figure 4. This delayed movement of the core supporting means and of the cores is desirable, so that the cores remain in operative position behind the fell of the cloth as long as possible, to permit the traveller to complete its motion, before the cores are swung forwardly. On the return movement of the reed and of the lay sword, the movement of the cores is similar. That is, they move rearwardly quite rapidly at the outset, so that they return to their operative position and come to rest relative to the lay and to the fell of the cloth, before the reed has returned to its most rearwardly disposed position.

Upon the end of the counter shaft 33, there is a sprocket 60, transmitting continuous movement to a chain 61, trained about another sprocket 62 constituting a conveyor drive, as hereinafter explained, and about a third sprocket 63, constituting the drive for the program switch 64.

As shown in Figures 2 and 2a, the upper core 44 and the lower core 47 are disposed in angular relation, corresponding to the angles of the warp threads, when separated by the harness. The upper core preferably consists simply of a plurality of laminations of silicon steel, arranged side by side, extending lengthwise and carried by a channel 65. The lower core 47 similarly consists of a plurality of laminations of silicon steel strips appropriately secured within the supporting channel 46, for instance by wedge strips 67, of the same kind of insulating material as the strip 48. As hereinafter explained, the lower core is preferably made up in a plurality of sections, has a number of slots cut therein, and is provided with a polyphase winding, certain coils of which are shown at 68 and 69 in Figure 2a.

At the foot end 22 of the lay, in the form of the invention shown in Figures 2, 2a, and 2b, the receiving device 23 for the travellers, projected through the shed by the travelling electromagnetic field, takes the form of a curved, U-shaped, return chute 70 having a flaring mouth 71 and a downwardly inclined exit end 72, extending through an opening 73 in the upper surface of the breast beam 10. Below the breast beam is a belt conveyor 75, journalled on rollers 76, 77 at opposite ends thereof. As the travellers are projected into the chute 70, their momentum carries them around to the opening in the breast beam, where they are deposited upon the conveyor 75 for return to the head end of the system.

When each traveller enters the return chute 70, the thread holding catch associated therewith is released, by engagement with the roof of the chute or by engagement with a special cam, not shown, so that the catch is opened and the thread is released.

At the head end of the system, there is a conveyor chain 78, trained about a plurality of idler sprockets 79, 80, 81, and 82 and about a driving sprocket 83. The chain, throughout its active run, travels in a slot 84 formed between plates 85 and 86 constituting a slideway for the traveller infeed system 26. In this slideway there is a spring stop finger 87, which arrests the movement of the line of travellers, as they are pushed forwardly in a continuous line by the conveyor belt 75, and until they are picked off one by one, by pusher pins 88 carried by blocks 89 associated with the chain 78. In other words, a line of travellers are moved forwardly by the belt, until they are arrested by the spring stop 87. The conveyor belt slides under their bottom surfaces and brings successive travellers into the line until their movement is arrested by contact with the trevellers ahead. Each pin associated with the chain 78 moves laterally between the brow of one traveller and the rear of the one ahead, engages the rear end of the leading traveller and pushes the same past the spring stop. The pin carries the traveller around the slideway until it moves away from the traveller, by passage around the idler sprocket 81, leaving the traveller in the proper position in the injection system, as indicated at 90 in Figure 2.

When in this position the traveller takes a thread from the thread presenting mechanism, and the injector mechanism is operated to project the traveller into the shed, into position to be operated upon by the linearly travelling electromagnetic field.

Before describing these mechanisms and their mode of operation, the preferred construction of the travellers per se will be considered, referring to Figures 23–27.

Each traveller 91 comprises a pair of sheet metal base plates 92 and 93, arranged in overlapping relations along their adjacent edges, substantially on the center line of the traveller, with a layer of insulating material 94 interposed therebetween. Along the line of the overlap, substantially centrally of the traveller, there are a plurality of sheet metal strips 95 and 96, with interposed layers of insulation 97. Adjacent the right hand portion, and above the base 93 are a plurality of additional sheet metal strips 98 and 99, preferably shaped substantially as shown, with layers of insulating material 100 interposed therebetween.

The base plates and the various strips are preferably made of sheet aluminum, while the insulation may be cloth impregnated with a suitable dielectric synthetic resin, adhesive material. The traveller is generally boat-shaped in plan and the forward end of the plate 92 is turned upwardly and rearwardly as indicated at 101, to provide a blunt prow to facilitate the travel of the device through the shed. The left hand marginal edge of the plate 92 is turned upwardly, as indicated at 102 and, at its forward end is curved inwardly and rearwardly, as at 103, where it joins the upturned portion 101, to complete the prow.

Secured to the rear portion of the plate 92 is a thread receiving and holding clamp assembly indicated generally at 105. The latter preferably comprises a fixed jaw member consisting of a base flange 106 (Figure 26) and an upstanding strip 107 having a plurality of teeth 108 along its upper edge. A movable jaw member 109 having an upwardly and rearwardly projecting tail piece 110 is pivoted to the strip 107 at 111 and is urged downwardly by a leaf spring 112, bearing against a pin 113 at its forward end and secured to the rear end of the fixed jaw by a screw 114.

The upstanding side flange 102 is preferably provided with a plurality of holes 115, for purposes hereinafter explained.

If desired, the rear edge of the plate 92 may carry an upstanding bracket 116, which serves as a surface against which the nose of a following traveller may abut.

The thread presenting device, best shown in Figures 2, 5, 8, and 9 is actuated by the drive shaft 118, upon which the driving sprocket 83 for the chain 78 is mounted. Hence, the movements of the thread presenter are coordinated with the movements of the pins on the chain, which advance the travellers to the position to receive the thread and to be projected into the shed.

A bracket 120 secured to the breast beam 10 carries a pivot pin 121 for the thread presenting arm 122 and a pivot pin 123 for a cam following arm 124. A link 125 connects the two arms. A cam following roller 126, carried by arm 124 is in engagement with the surface of a cam 127, fast on the shaft 118.

The thread presenting arm 122 has a downwardly turned rear end 128, upon the lower end of which is secured a pair of leaf spring fingers 129, having flaring forward ends, as indicated in Figure 10. The arm also carries a rearwardly projecting thread guiding eye 130 and a downwardly projecting thread guiding post 131, having an eye adjacent its lower end.

Projecting forwardly from a fixed post 132 is an arm 133 having on its forward end a vertically adjustable pin 134, secured in adjusted position by a pair of nuts 135. As shown in Figure 9, the pin 134 carries a rearwardly extending foot 136, directly above the upwardly and rearwardly extending tail piece 110 of the pivoted jaw of the thread clamp, so that, as the traveller is moved into position, the jaw is opened.

As the traveller is moved up to the position shown at 90 in Figure 2 and in dotted lines in Figure 5, the arm 122 is just reaching the full line position, with the weft thread 140, leading from a suitable source of supply, guided through the eyes 130 and 131 and with its free end gripped between the spring fingers 129. As the traveller is moved forwardly to said position, the jaws of the thread clamp are opened, as explained above, and the weft thread is carried into a position between the upper and lower jaws. The injector mechanism, described below, projects the traveller forwardly into the shed. The movable jaw snaps shut, firmly grips the thread, jerks the free end thereof out of the spring fingers 129, and carries the thread through the shed. While this is occurring, the cam 127, rotating in the direction of the arrow in Figure 5, swings the cam following arm 124 and the thread presenting arm 122 toward the right. After the traveller has completed its traverse of the lay and just before the reed has completed its action of beating the thread into the fell, the arm 122 reaches the position shown in dotted lines in Figure 5, and the spring fingers are again brought into gripping relation to the thread. Immediately thereafter, the thread is cut adjacent a fixed guide post at 142. As the cam continues to rotate, the arm 122, with the cut thread gripped in the fingers 129 returns to the original position and presents the thread to the opened jaws of the next traveller. Meanwhile, the reed completes its operation, the harnesses shift the warp threads and the machine is ready for another cycle of operation.

It should be noted that the delivery end 86a of the slideway is tipped downwardly and rearwardly to correspond to the angle of inclination of the upper surface of the lower core member. The injector assembly comprises a pair of supporting members 145, 146 having their upper surfaces similarly inclined, which receive the travellers from the slideway section 86a, under the impulse of the pusher pins 88.

As shown in Figures 5 and 6, the supporting member 145 is cut away as at 147, providing a slot through which the upper end 148 of an injecting arm 149 may extend. The latter may constitute a laterally turned portion of a longitudinally extending rod 150, guided in appropriate lugs 151, carried by a horizontal plate 151a, and normally urged forwardly by a compression spring 152 connected to and bearing against a collar 153 fast on the rod. This spring is connected to the collar and to the rear guide lug 151 under torsional tension, so as to tend to rotate the rod in a direction to urge the arm 149 downwardly into firm engagement with a stationary keeper plate 155 having a notch 156 in its upper surface.

Referring to Figure 6, the lower end of the shaft 118 carries a bevel gear 157, in mesh with a similar gear on a shaft 158 having a laterally projecting arm 160 thereon as well as a sprocket 161. A chain 162, trained about sprocket 161 and about a sprocket 163 on the main drive shaft 30, drives the shaft 118 and all of the parts connected thereto.

A bracket 165, provided with a laterally turned end 166, carries a pin 167, which serves as a pivot for a block 168, having a socket for the lower, laterally turned end 169 of an upwardly extending, swinging arm 170. To the upper end of this arm is secured a laterally projecting finger 171, directly below the rod 150, in position to engage the collar 153. A tension spring 172 constantly urges the swinging arm 170 forwardly or to the right as viewed in Figure 2. The swinging movements of the arm 170 are guided by a strip 173, secured by appropriate bolts in spaced relation to the plate 151a, which constitutes the support for the lugs 151, in which the rod 150 is guided, and for the keeper plate 155.

The swinging arm 170 carries a cam plate 175, disposed in the path of movement of the laterally projecting, revolving arm 160. Hence, during each revolution of the arm 160, the arm 170 is swung rearwardly or toward the left, in Figure 2. The finger 171 at the upper end of the arm 170 engages the collar 153 and moves the rod 150 rearwardly or to the left in Figures 2 and 6. At the end of this movement, the laterally turned end 149 of the rod snaps downwardly into the notch 156 of keeper plate 155 and the injector is retained in this retracted position, while the swinging arm 170 moves forwardly to its original position, under the influence of the spring 172.

A trigger rod 177 has one of its ends 178 hooked around the upwardly extending end of the laterally turned portion 149 of the injector, and its other end connected at 179 to a lever 180, pivoted to the loom at 181 and disposed in engagement with a cam 182 carried by the main drive shaft 30. When the projection on the cam 182 swings the lever 180 toward the left (Figure 6), the trigger bar 177 lifts the laterally turned portion 149 out of the notch 156 in the keeper plate and projects the end of the injector upwardly behind the associated traveller. As soon as the injector is thus released, the compression spring 152 projects the same forwardly, to inject the traveller into the shed, in position to be acted upon by the linearly travelling electromagnetic field. The revolving arm 160 then re-engages the cam 175, so that the finger 171 again engages the collar 150 and returns the parts to their original, cocked position.

The modification shown in Figures 3, 3a, and 11–19 differs from the foregoing primarily as regards the mechanisms for receiving the travellers, for returning them to the head end of the lay and for delivering them to the injector mechanism. Otherwise, the parts may be substantially identical.

Instead of using a return chute 70, this form of the invention includes an intermittently rotating dial 185 disposed above a platform 183 at the foot end of the lay, having a plurality of pockets 186 therein, which are positioned to receive the travellers as they are projected out of the field. Also, the conveyor belt 75 has been eliminated and an extension of the sprocket chain substituted therefor.

Beneath the breast beam 10 are a pair of angle irons 187, 188 along which the travellers move, under the influence of pins 189, carried by blocks 190 associated with an elongated chain 191, trained about the sprockets previously mentioned and receiving movement from the driving sprocket 83 on shaft 118. From the idler sprocket 82, the chain extends toward the right, below the breast beam, behind the angle iron 188 in a return or inactive run 192. At the foot end of the lay, the chain is trained about a sprocket 193 on the upper end of a stub shaft 194 (Figure 12) journalled in a bracket 195 carried by a channel member 196 secured to the breast beam 10. Additional tensioning and idler rolls may be provided if desired, as indicated in Figure 3. From these sprockets, the chain extends forwardly along its active run 197, toward the infeed mechanism 26.

The lower end of the shaft 194 (Figures 12 and 13) carries the first gear 198 of a Geneva gear train, the other gear 199 of which is fast upon a stub shaft 200 journalled in the lower leg of the bracket 195. The stub shaft also carries a spur gear 201 in mesh with a larger spur gear 203, fast on the lower end of the shaft 204, upon which the dial 185 is mounted, the shaft being journalled in the laterally projecting webs of the channel member 196. The Geneva movement and the speed reducing gear train thus provided serve to provide intermittent rotation to the dial so that one pocket is always in the proper position to receive a traveller.

The dial comprises a circular metal plate 205 centrally secured adjacent the upper end of the shaft 204 and having three upstanding, tubular bosses 206 secured to its upper surface, in alignment with the holes in the plate. Each boss is provided with a pair of diametrically opposed guide slots 207 and a laterally facing horizontal slot 208 for purposes hereinafter explained. Clamped to the lower surface of the plate 205, by a lower plate 209 is a rubber block 210 having three radial arms shaped to provide the three peripheral pockets 186 for the travellers. At the rear end 211 of each pocket, there is a heel plate 212, comprising a vertical rear portion 213, an upper portion disposed between the rubber block 210 and the plate 205, and a laterally and forwardly tipped bottom portion 214, adapted to underlie the rear end of the traveller.

Suspended from the top plate 205 at the leading end of each pocket is a rubber sheet 216 having a plurality of depending rubber fingers 217 formed integrally therewith, adapted to be engaged by the travellers as the latter enter the pockets, to arrest their movement and to absorb shock. Adjacent the top of the rear portion of each of the pockets, below the plate 205, there is a generally triangular plate or shoe 218, secured to the lower end of a sleeve 219 extending upwardly into the hollow boss 206 and connected in turn to an upwardly projecting stem 220. Secured to the upper end of the stem 220 is a bifurcated head 221 in which a roller 222 is journalled. A compression spring 223 is interposed between the upper end of the boss 206 and the head 221, to urge the parts upwardly. A guide pin 224 carried by the sleeve 219 rides in the slots 207 in the boss and prevents rotation of the shoe 218.

A latch 225, pivoted to the upper surface of the plate 205 has an end adapted to be projected through the slot 208, to catch over the upper end of the sleeve 219, to hold the shoe 218 in the depressed position, as hereinafter explained. The end of each latch is projected into the slot 208 by a spring 226 interposed between its trailing end and a fixed abutment 227 carried by the plate 205.

As noted above, the dial comes to rest substantially in the position indicated in Figure 11, with one pocket in position to receive a traveller projected from the shed. At this time, the associated shoe 218 is in the uppermost position shown in Figure 15. The support for the upper core is indicated at 42a in Figures 11, 12, and 14. It should be noted that this I-beam carries a cam 228 which, upon forward swinging movement thereof approaches the roller 222 of the dial pocket positioned to receive the traveller. As indicated in Figure 14, the cam depresses the roller, the stem 220, the sleeve 219, and the shoe 218, until the end of the latch catches over the upper end of sleeve 219, holding the parts in the lower position. During its downward movement, the shoe 218 engages the rear portion 110 of the movable jaw of the thread holding catch and thereby releases the thread. The core supporting bar 42a and the cam 228 may now swing rearwardly, leaving the shoe depressed and the catch open. As the dial moves around through one-third of a revolution, the thread is removed from the catch and left behind.

Positioned adjacent the path of movement of the dial is a bracket 229 having a roller 230 carried thereby, at the elevation of the latches 225. The outer, curved edge surfaces of each latch, during its movement past the roller, engages the same so that the trailing end thereof is pushed radially inwardly and the other end is withdrawn from the slot, thereby permitting the shoe 218, the sleeve 219, and the stem 220 to rise under the influence of the compression spring 223. Hence, the pocket is restored to the traveller-receiving condition.

The breast beam 10 adjacent the dial 185 has its upper surface cut away, as indicated at 235 and a downwardly inclined slide 236, constituted by an extension of the platform 183, extends downwardly to the level of angle irons 188 and 187, the slide being cut out as at 237, to provide clearance for pins 189 carried by the chain 191. Hence, as the travellers are pushed around on the platform 183 by the dial, they drop out of the pockets and move down the slide extension 236 under the influence of gravity, until they are picked up by the pins 189 carried by the chain and advanced toward the infeed mechanism 26.

From the foregoing, it will be understood that, in the operation of this form of the invention, the travellers are projected, by the electromagnetic field into the pockets 186 in the dial 185, with the forward ends of the travellers arrested by the rubber fingers 217. As the core support 42a swings forwardly, a spring finger 228a depending therefrom adjacent the cam 228, engages the rear end of the traveller and pushes the same firmly into registry with the heel plate 212. The cam 228 carried by the core support moves forwardly, engages the roller 222 and depresses the shoe 218, thereby releasing the thread catch on the associated traveller and permitting the traveller to move around, leaving the thread behind. The traveller is maintained in the pocket by an upstanding guide wall 234. The shoe 218 is held in the depressed position by the latch 225, until the trailing end thereof engages the fixed roller 230, at which time the spring 223 raises the shoe. The traveller, on the next intermittent movement of the dial drops out of the pocket and moves downwardly on the slide extension 236, where it is picked up by the pins on the chain and returned to the infeed system.

In Figure 20, a preferred form of thread cutter is shown. The details of construction of the swinging arms 40a and the core supporting beam 43a are slightly different from those shown in Figure 4, but these differences are unimportant. The lay sword 36a at the head end of the machine is curved rearwardly as at 36b, to clear the support 145 associated with the injector mechanism. The lay sword carries a forwardly projecting plate 237, arranged to enter the space between the discharge end of the injector mechanism and the entrance ends of the shed of the cloth, when the lay sword and the reed are swung forwardly to beat the filling into the fell. Secured to this plate 237 is a holder 238, of heat resisting, insulating material, such as asbestos board, having a notch in its forward edge, in which an electric resistance element 239 is mounted. The element is maintained in a highly heated condition by current delivered thereto from a suitable source by appropriate wires, shown diagrammatically at 240 and 241. As the core supporting arms 40a swing forwardly to the dotted line position and as the lay swords 36 and 36b also swing forwardly, the heated element 239 comes into contact with the thread drawn tightly about the pin 142, at the end of the support 145 of the injector mechanism, thereby severing the thread.

In Figure 21, a mechanical shear is illustrated. The latter may be mounted on the plate 237, by a pair of screws 242, in place of the asbestos holder 238. The shear consists of a fixed blade 243 and a movable blade 244 having an upwardly curved rear end 245 adapted to engage a projection, not shown, carried by the end of the traveller-supporting plate 145 so that, when the shear swings forwardly with the lay sword, the jaws are closed at the desired point to sever the thread. On the return movement, the shears are opened by a tension spring 246.

In Figure 28, a side elevation of the top and bottom cores is shown with an end section broken away and with the coils indicated somewhat diagrammatically. As stated above, the top core 44 consists of silicon steel laminations, extending from end to end of the lay, carried by a channel member. As pointed out below, an electromagnetic field is produced between this top core and the bottom core, and the top core, having no coils wound thereon, provides a return path for the flux produced by the current flowing through the windings on the bottom core.

The bottom core 47 consists of similar silicon steel laminations with a plurality of slots 250 cut therein, for instance on one inch centers and one inch deep. Each coil 251 spans 5 inches. The first coil from the left lies in the bottom of the first slot and in the bottom of the sixth slot. The second is disposed in the second and seventh slots and so forth, from end to end. Throughout the major portion of the core, each slot contains the right-hand end of one coil and the left-hand end of another.

Figure 29:
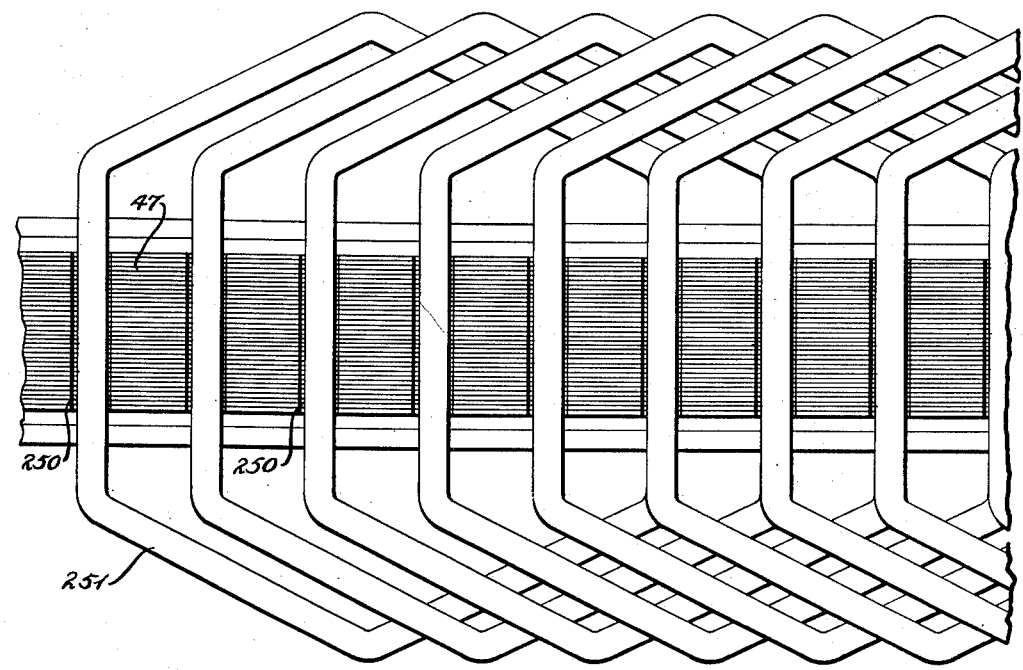
Figure 29 is a plan view on an enlarged scale of an end section of the bottom core, showing the winding of the coils thereon.
Figure 30:
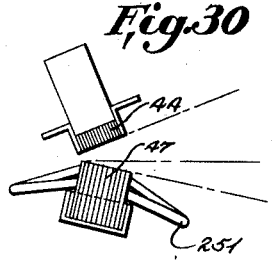
Figure 30 is an end elevation of the cores shown in Figure 28.

Referring to Figures 28 and 29, the first three coils at the left are connected in series in one phase; the second three are connected in series in the second phase; the third three are interconnected in series and are in series with the first three, in the first phase, but the connection is such that the current flows therethrough in the opposite direction, as indicated by the arrows, to produce a two-pole winding and a two-pole magnetic field; and the second three coils, which constitute the first set in the second phase, are connected to the fourth three coils, which constitute the second set in the second phase, with reverse current flow, to provide a two-pole winding. Thus, each section of the core has twelve coils associated therewith, six in each of the two phases.

With the arrangement shown, there is a 5-inch coil pitch and a 6-inch pole pitch, producing a linearly travelling electromagnetic field by virtue of the interaction of the phases.

As indicated in Figure 33, the core 47 is divided into four sections, but it must be understood that any number of sections may be employed. The division between the different sections may be entirely electrical, in which case the silicon steel laminations extend from end to end of the core, or it may be physical as well as electrical, in which case the laminations extend only throughout the length of the coils of each section. As shown in Figure 33, the left-hand core and coil section may be employed for electrical injection of the travellers into the shed, but, if mechanical injection is employed, as described above, this section may be eliminated.

A preferred electrical circuit and circuit controller for energizing the electromagnetic core, section by section, is shown in Figure 33 and also, in part, in Figures 28, 29, and 31.

Referring to Figure 31, a program switch is shown, comprising a plurality of stationary rings 255, 256, 257, and 258 having electrical contact elements secured to their inner surfaces. A central rotor 259, having a shaft extension 260 may be driven by the sprocket 63 shown in Figure 4. The rotor carries four slip rings 261, 262, 263, and 264 connected to four rotary brushes 265, 266, 267, and 268 as indicated in Figure 33. The slip rings are in contact with stationary brushes 269, 270, 271, and 272. Brush 269 is connected to phase 1; brush 270 is connected to phase 2; brush 271 is connected to phase 1 and the condensers hereinafter described; and brush 272 is connected to phase 2 and other condensers, as hereinafter explained. The contacts on the inner surface of the rings 255—258 are connected to the coils and to the condensers as shown in the circuit diagram.

With the brushes 265—268 in the position shown in Figure 33, the section indicated at 276 is energized.

In operation, brush 268 rotating in the direction of the arrow in Figure 33, first makes contact with contact 280 on ring 258, connecting coil S'F' across condenser $C_1'$ and also to one line of phase 2. At the same instant, brush 267 makes contact with contact 280a on ring 257 connecting coil SF to condenser $C_1$ and also to one side of phase 1. At the next instant, brush 266 makes contact with contact 280b on ring 256 which connects condenser $C_1'$ and coil S'F' to the other line of phase 2. At the same instant, brush 265 makes contact with contact 280c which connects coil SF and condenser $C_1$ to the other line of phase 1. At this time, and as long as brushes 265 and 266 remain on contacts 280c and 280b, respectively, the section of core 276 remains energized and capacitor $C_1$ and $C_1'$ remain connected across the coils and the line, forming a parallel circuit which resonates at the applied frequency.

Brushes 265 and 266 leave contacts 280c and 280b before brushes 267 and 268 leave contacts 280a and 280. The instant this takes place, both the above mentioned coils and condensers are disconnected from the line. However, condensers $C_1$ and $C_1'$ remain connected across coils SF and S'F' as long as brushes 267 and 268 remain on contacts 280a and 280. During this time, the energy stored in the magnetic fields of coils SF and S'F' dissipates in the condensers $C_1$ and $C_1'$, thus minimizing or eliminating the sparks which would normally result when brushes 265 and 266 leave contacts 280c and 280b.

An instant later, brushes 267 and 268 make contact with contacts 281a and 281 respectively connecting coils 1A and 1'A' across $C_2$ and $C_2'$ and at the same time connecting each to one side of phase 1 and phase 2 respectively. Brushes 267 and 268 may or may not at this time be still in contact with contacts 280a and 280. An instant later when brushes 265 and 266 make contact with contacts 281c and 281b, respectively, coils 1A and 1'A' and condensers C2 and C2' are connected across phase 1 and phase 2 and are hence energized in parallel, just as the previous section was. This manner of connecting the capacitors across the coils and subsequently connecting both coils and capacitors in parallel across the lines, thus energizing them, and further disconnecting the lines from the parallel combination to afford dissipation of the energy stored in the magnetic field is repeated from section to section.

By connecting the capacitors to alternate sections, it is possible to enable one set of capacitors to be discharging the previous set of coils, while the other set of capacitors is resonating with the coils being energized at any instant, inasmuch as there is ample time to switch the first set of capacitors to the next succeeding set of coils before it becomes necessary to energize them. In this way, it is possible with two pairs of capacitors to take care of an unlimited number of sections since each pair of capacitors operates with alternate coil sections.

The arrangement of the fixed contacts on a typical pair of the stationary rings, such as rings 258 and 256, are shown in Figure 32, with the brushes 268 and 266, indicated in dotted lines, moving in the direction of the arrow in that figure. The contacts 280b, 281b, 282b, etc. on ring 256 are in the form of rectangles, separated at their adjacent ends by bodies of insulating material, while the contacts 280, 281, 282, on ring 258, are in the form of oblique angle parallelograms, having their adjacent ends similarly separated. Hence, the leading and trailing ends of contacts 280, 281, 282, etc. extend beyond the leading and trailing ends of the corresponding contacts 280b, 281b, 282b, etc. on ring 256. As a result, brush 268 engages the contacts on its ring 258 before the brush 266 engages the corresponding contacts on ring 256, and the former remains in contact with its contacts after the latter has moved out of contact with the corresponding contacts on its ring. Although this arrangement of contacts is preferred, many other shapes and arrangements of contacts to perform the same function will occur to one skilled in the art. The contacts on the other pair of rings for the other phase, are similarly arranged.

It will be understood that the terminals illustrated in the upper left hand corner of Figure 33 are a diagrammatic representation of leads extending through a cable or the like, as shown, leading to the various coils shown diagrammatically in the lower portion of the circuit diagram. The reference characters on the terminals, F', A', B', and C' designate wires leading to the coils correspondingly lettered at the bottom of the figure. Similarly, terminals F, A, B, and C, at the upper left hand corner of the circuit diagram lead to coils F, A, B, and C. Terminals S' and 2', 1' and 3', S and 2, and 1 and 3 lead respectively to coils S' and 2', 1' and 3', S and 2, and 1 and 3. It will be noted from the lower portion of the circuit diagram that these pairs of coils are connected respectively to common lead-in lines.

Referring to Figures 23–27, the manner in which the traveller is steered through the electromagnetic field will now be described. The upper and lower cores 44 and 47, arranged in angular relation, form a triangular shaped air gap and provide a magnetic flux of non-uniform density across the pole piece, of greater strength where the edges of the cores are closest together, since the upper core provides the return path for the flux.

The operation of this traveller is probably best explained by reference to the widely accepted theory that any magnetic circuit will so arrange itself as to accommodate maximum flux. Thus, any portion of such a magnetic circuit which is free to move will move in such a manner as to allow maximum flux to be obtained in the system. In this particular case, the main flux produced by the windings on the core tends to be opposed by eddy currents which are induced in the plates which constitute the travellers. In its simplest form, the traveller would be a single plate of conducting material. Such a traveller when subjected to the gliding magnetic flux heretofore described would have eddy currents induced in it which would oppose any tendency for the flux linking the traveller to change. However, since the traveller is free to move, there would be a tendency for it to move in such a direction as to minimize the currents induced in it, at the same time maximizing the flux. There are several directions in which such a traveller might move, only one of which it is desired that the traveller take. In most other electromagnetic induction systems, the moving member is restrained either by bearings or some other device from taking any direction other than the one desired. However, in the present case, it is important that the necessity for any mechanical or physical steering member be eliminated.

In order to minimize the forces tending to throw the traveller out of the field sideways, the traveller is split into two plates, insulated from one another. The separation between the plates is located very nearly on the longitudinal center line of the traveller. However, if the system were changed in any way, this separation might well be changed. When the traveller is divided into two independently acting plates insulated from one another, the eddy currents induced in the right-hand plate tend to exert a force which moves the traveller sideways out of the field in the right-hand direction, while similar currents induced in the left-hand plate, in a similar manner, tend to pull the traveller in the opposite direction. Fortunately, these forces are stable because as the right-hand plate tends to move in the right-hand direction, the force tending to pull this plate to the right decreases, while the forces tending to pull the left-hand plate to the left increase by virtue of the fact that the right-hand plate is moving towards a region of minimum flux, while the left-hand plate is being moved into a denser portion of the flux field. An entirely similar reaction would take place if the traveller tended to move to the left.

It was found, however, that although these forces tending to steer the traveller were essentially self-stabilizing, the very low mass of the traveller gave rise to a tendency toward overcontrol, the net result being that a simple traveller made up of the above mentioned two plates was not entirely stable and could not be depended upon. In order to eliminate this tendency toward overcontrol, the additional plates 98, 99, 96, and 95 were added in the position shown. Such a traveller is quite stable and will correct for errors of initial positioning up to about one-half inch.

The steering plates 98 and 99 are positioned outside of the main field flux when the traveller is in the normal position. Any tendency for the traveller to draw these two plates into the densest part of the field flux is opposed by eddy currents induced in each of these plates. Hence, plates 98 and 99 afford a positive corrective steering force in that direction. Plates 95 and 96 are located on the other side of the densest portion of the flux when the traveller is in the normal position, and any tendency on the part of the traveller to move in a direction to pull these plates into the densest portion of the flux is similarly opposed by the action of eddy currents induced in these plates 95, 96.

Hence, the combined action of the two sets of steering plates is such as to force the traveller to maintain a normal position or to regain normal position, if disturbed. In this normal position, the densest flux passes through the plate 93, between the two sets of steering plates, 98 and 99, on the one hand, and 95 and 96, on the other.

Aside from the electrical forces acting on the traveller, it should be noted that mechanical forces exist, some a result of contact with the threads in the warp and others as a result of the rapid motion of the traveller, which might be referred to as aerodynamic forces. It is necessary, therefore, to so shape the plates as to afford easy passage through the shed of the cloth at the same time shaping the nose of the traveller in such a way that the tendency for the traveller to lift is reduced to a minimum. In Figures 23 and 25, it will be noticed that the plate 92 is so shaped as to afford a smoothly curved nose which facilitates the passage of the traveller through the shed. Also a wall 102, extending from front to rear on the traveller, imparts rigidity to the structure and maintains the shed clear, so that none of the warp threads can be affected by the presence of the catch 105 on the traveller.

The wall on the side of plate 92, or its equivalent, is necessary for the above reasons. However, its presence does to some extent affect the electrical characteristics of plate 92. It is desirable, therefore, to remove any electrical dissymmetry, which might have been introduced by the wall, by choosing a suitable height for the wall and also by breaking the wall up electrically, for instance, by drilling holes 115 therein, or the like.

Since the method of operation of the apparatus of the present invention has been described above, it will not be repeated here.

It must be understood that the invention is not limited to the particular mechanical instrumentalities shown in the accompanying drawings and described above, as these devices are simply illustrative of many which might be devised to perform the essential functions outlined above.

The electrical system may be modified within the skill of the calling, without departing from the present invention, since modifications will become apparent, in view of the teaching of the present specification and drawings. All modifications coming within the scope of the appended claims and their equivalents are intended to be included in the invention.

I claim:

1. In a loom having means providing a shed of the warp behind the fell of the cloth, and a reed for beating the weft into the fell, an elongated core extending across the warp, longitudinally below the shed of the warp, a second core disposed in parallel relation to the first core above the shed of the warp, a plurality of electromagnetic coils wound on one of said cores constituting a linear polyphase winding for that core, means for delivering polyphase current to said coils to produce between the cores a linearly travelling electromagnetic field along the shed of the warp in a direction from one end thereof toward the other, and a thread carrying traveller in which currents are induced by the flux of said field to cause the traveller to traverse the shed.

2. In a loom having means providing a shed of the warp behind the fell of the cloth, and a reed for beating the weft into the fell, an elongated core extending across the warp, longitudinally below the shed of the warp, a second core disposed in parallel relation to the first core above the shed of the warp, a plurality of electromagnetic coils wound on the first core constituting a linear polyphase winding for said first core, means for delivering polyphase current to said coils to produce between the cores a linearly travelling electromagnetic field along the shed of the warp in a direction from one end thereof toward the other, and a thread carrying traveller comprising a plurality of laminations of electrically conductive material insulated from each other, in which currents and flux are induced by said travelling field flux to cause the traveller to follow the field and to traverse the shed.

3. A loom in accordance with claim 1 in which the cores are mounted for periodic movement away from the shed of the warp and the fell, to permit the reed to beat the weft thread into the fell of the cloth.

4. A loom in accordance with claim 1 in which the cores are mounted for forward swinging movement from the shed of the warp to a point beyond the fell and in which means are provided for coordinating the movement of the cores with the movement of the reed to permit the reed to beat the weft into the fell of the cloth.

5. In a loom having means providing a lay and a reed for beating the weft threads into the fell of the cloth, an elongated core extending across the warp longitudinally of the lay, a plurality of electromagnetic coils wound on the core in partially overlapping relation and constituting a polyphase winding associated with said core extending from end to end thereof, means for delivering polyphase current simultaneously to the coils along certain sections of said core only to energize the same and to produce in the energized sections a linearly travelling electromagnetic field while the other sections are de-energized, and a thread carrying traveller in which current and flux are induced by said field to cause the traveller to traverse the lay.

6. In a loom having means providing a lay and a reed for beating the weft threads into the fell of the cloth, an elongated core extending across the warp longitudinally of the lay, a plurality of electromagnetic coils wound on the core in partially overlapping relation and constituting a polyphase winding associated with said core extending from end to end thereof, means for delivering polyphase current simultaneously to the coils along certain sections of said core only to energize the same and to produce in the energized sections a linearly travelling electromagnetic field while the other sections are de-energized, said means serving to deliver said current to the sections progressively from one end of the core toward the other, whereby the area of the travelling electromagnetic field is shifted from one end of the core to the other, and a thread carrying traveller in which current and flux are induced by said field to cause the traveller to traverse the lay.

7. In a loom, an elongated magnetic core positioned along the lay, a plurality of groups of induction coils wound on said core providing a linear polyphase winding, a source of polyphase current, and means for delivering the current from said source to the individual groups of coils to produce in the associated core section a linearly travelling electromagnetic field, said means comprising a capacitance, circuit making and breaking means for each phase, and means for operating said means to connect the several groups and capacitance successively in a sequence in which each group is first connected across a capacitance, then the group and capacitance are connected across and subsequently disconnected from the source to energize the coils and then to allow the coils to discharge through the capacitance, and then the coils are disconnected from the capacitance.

8. In a loom, an elongated magnetic core positioned along the lay, a plurality of groups of induction coils wound on said core providing a linear polyphase winding, a source of polyphase current, and means for delivering the current from said source to the individual groups of coils to produce in the associated core section a linearly travelling electromagnetic field, said means comprising a capacitance, a pair of circuit makers and breakers for each current phase, and means for operating the latter to connect the several groups and capacitance successively in a sequence in which each group is first connected across a capacitance, then the group and capacitance are connected across and subsequently disconnected from the source to energize the coils and then to allow the coils to discharge through the capacitance, and then the coils are disconnected from the capacitance.

9. In a loom, an elongated magnetic core positioned along the lay, a plurality of induction coils wound on said core in overlapping relation providing a linear polyphase winding, electrical connectors connected to the coils, and separating the same into successive groups longitudinally of the core, a source of polyphase current and means for delivering current from each phase to the appropriate coils in the individual groups, successively from one end of the core toward the other, whereby to create in each group when connected to the source a linear travelling electromagnetic field, said means comprising a condenser for each phase, a circuit controller for each phase, and means for operating the circuit controllers so that the coils of each phase in said groups are successively connected across their condensers, then connected with their condensers to the source, then disconnected with their condensers from the source to allow the coils to discharge through the condensers and then disconnected from their condensers.

10. In a loom, an elongated magnetic core positioned along the lay, a plurality of induction coils wound on said core providing a linear polyphase winding, a plurality of pairs of terminals for each phase connected to the coils and dividing the coils into a plurality of groups arranged successively along the core from end to end thereof, a source of polyphase current, a circuit controller for each phase, circuits leading from each circuit controller to the terminals of the successive groups, a pair of condensers for each phase in circuit with the corresponding controller, and means for operating the controllers first to connect the coils for each phase of one group across one condenser of the pair for the corresponding phase, then to connect said condensers and said coils across the corresponding phase, then to disconnect said coils and said condensers from the source to allow the coils to discharge through their condensers, then to disconnect said coils from the condensers, then to connect the coils of the next group for each phase across the second condenser of the same pair, then to connect the second condensers and the second group of coils across the corresponding phase, then to disconnect the second group of coils and the second condensers from the source to allow the second group of coils to discharge through the second condensers, and then to disconnect the second group of coils from the second condenser.

11. In a loom, an elongated magnetic core positioned along the lay, a plurality of individual induction coils constituting a polyphase winding on said core, said coils having a plurality of pairs of terminals for each phase winding dividing the coils into a plurality of groups arranged successively along the core, a source of polyphase current, a pair of condensers for each current phase, a program switch having a pair of sets of fixed contacts for each phase and a movable contact arranged to cooperate with each set of fixed contacts successively, and circuits interconnecting the group of coils with the program switch and with the condensers, said circuits and contacts being arranged so that the coils in the first group for each phase are independently first connected across one condenser of the pair for the corresponding phase, then said groups and said condensers are connected across their phase source, then the groups and the condensers are disconnected from their source to discharge the coils through said condensers, and then the groups are disconnected from the condensers, and the sequence is repeated with the coils in the second group for each phase connected across the other condenser of the pair for the corresponding phase.

12. In a loom, an elongated magnetic core positioned along the lay, a plurality of induction coils wound on the core providing a linear polyphase winding, a plurality of pairs of terminals connected to the coils and dividing the coils into a plurality of groups arranged successively along the core, a source of polyphase current, a pair of condensers for each phase, means for connecting the coils of one group for one phase across one condenser of one pair and the coils of the same group for another phase across one condenser of another pair, means acting immediately thereafter to connect said coils and said condensers across their corresponding phases of said source, means acting after a predetermined time to disconnect said coils and said condensers from said source to allow the coils to discharge through the condensers, means operating immediately thereafter to disconnect said coils from said condenser, and means operating immediately thereafter for similarly connecting and disconnecting the coils of the next group to the other condenser of each pair and to and from their corresponding phases.

13. In a loom having means providing a lay behind the fell of the cloth and a reed for beating the weft into the fell, means extending along the lay providing a linearly travelling polyphase electromagnetic field, a plurality of travellers in which currents may be induced by the field to cause the same to traverse the lay, each traveller having a releasable thread clamp secured thereto, means for positioning the travellers successively adjacent the head of the lay, means for presenting a thread to each traveller at said position, means for injecting the travellers successively into the field, means at the other end of the lay for receiving the travellers and for releasing the thread from the associated clamp, means for cutting the thread at the head of the lay, and means for storing a plurality of travellers and for returning them successively to said positioning means.

14. An apparatus in accordance with claim 13, in which the means for providing the field comprises an elongated core with a plurality of induction coils wound in polyphase relation thereon.

15. Apparatus in accordance with claim 14 characterized by the inclusion of means for energizing the coils section by section, from the head to the foot end of the lay as the travellers traverse the lay.

16. In combination, in a loom, an elongated core having a polyphase winding thereon producing a linearly travelling electromagnetic field, a plurality of thread carrying travellers, and means for introducing the travellers into said field for longitudinal movement therethrough, each of said travellers comprising a pair of elongated plates secured together along adjacent edges in electrically insulated relation and extending laterally in opposite directions from their line of junction, whereby eddy currents induced in the plates by the flux of said field center the traveller relative to the field and prevent lateral displacement thereof during its longitudinal movement therethrough.

17. In combination, in a loom, an elongated core having a polyphase winding thereon, a second elongated core associated therewith, means energizing the first mentioned core to produce a linearly travelling electromagnetic field having a flux intensity diminishing laterally from a longitudinal zone of maximum intensity, a plurality of thread carrying travellers and means for introducing the travellers into said field for longitudinal movement therethrough, each of said travellers comprising a pair of elongated metal plates secured to each other along adjacent longitudinal edges with electrical insulating material interposed, whereby eddy currents induced in each of the plates tend to maintain the plates on opposite sides of said zone of maximum flux intensity to guide the traveller longitudinally through the field.

18. An apparatus in accordance with claim 17 characterized in that each of said travellers carries a pair of laterally spaced, longitudinally extending steering plates insulated from the first mentioned plates and in which eddy currents are set up by the field, said eddy currents mutually serving to resist lateral shifting of the traveller relative to the zone of maximum flux intensity.

19. Apparatus in accordance with claim 17, in which each traveller is provided with two laterally spaced, longitudinally extending sets of steering plates, insulated from each other and from the first mentioned plate, whereby eddy currents induced in said steering plates resist lateral shifting of both sets of plates into the zone of maximum flux intensity and guide the traveller through the field.

20. The combination set forth in claim 19 characterized in that each set of steering plates consists of a pair of superposed plates mounted upon one of the first mentioned plates with layers of insulation interposed.

21. For use in a loom having a pair of parallel, elongated, angularly arranged cores producing a linearly travelling electromagnetic field having a flux intensity varying transversely from a longitudinal zone of maximum intensity, a thread carrying traveller comprising a pair of elongated metal plates secured along their adjacent longitudinal edges in electrically insulated relation, whereby currents induced in said plates tend to maintain the outer edges thereof on opposite sides of said zone.

22. A traveller in accordance with claim 21 in which a pair of laterally spaced longitudinally extending steering plates are mounted thereon in electrically insulated relation.

23. A traveller in accordance with claim 21 in which two pairs of superposed longitudinally extending, laterally spaced steering plates are mounted thereon in electrically insulated relation to each other and to the first mentioned plates.

24. A thread carrying traveller comprising a pair of base plates secured together in overlapping relation substantially along the center line and electrically insulated from each other, an upstanding side wall, an upwardly and rearwardly projecting surface providing a blunt pointed end, and a thread holding clamp carried by one of said plates below the upper edge of said side wall.

25. A traveller in accordance with claim 24 in which the side wall is electrically interrupted to eliminate substantially the creation of eddy currents therein.

WILLIAM C. BIRTWELL.

REFERENCES CITED

The following references are of record in the file of this patent:

UNITED STATES PATENTS

| Number | Name | Date |
|---|---|---|
| 720,181 | Salisbury | Feb. 10, 1903 |
| 757,121 | Johnson | Apr. 12, 1904 |
| 782,134 | Horry | Feb. 7, 1905 |
| 1,350,300 | Crumpton | Aug. 24, 1920 |
| 1,966,077 | Nyman | July 10, 1934 |
| 1,976,095 | Rourke | Oct. 9, 1934 |
| 2,112,264 | Bowles et al. | Mar. 29, 1938 |
| 2,135,373 | Wilson | Nov. 1, 1938 |
| 2,203,568 | Grondahl | June 4, 1940 |

FOREIGN PATENTS

| Number | Country | Date |
|---|---|---|
| 179,034 | Switzerland | Nov. 6, 1934 |
| 412,937 | Great Britain | July 2, 1934 |